Figure 3:
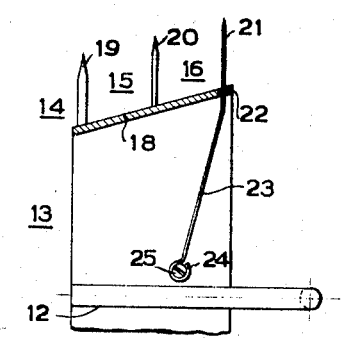

Sept. 23, 1958  C. VAN DER LELY ET AL  2,852,905
ROTARY RAKING WHEEL
Filed Jan. 13, 1954  2 Sheets-Sheet 1
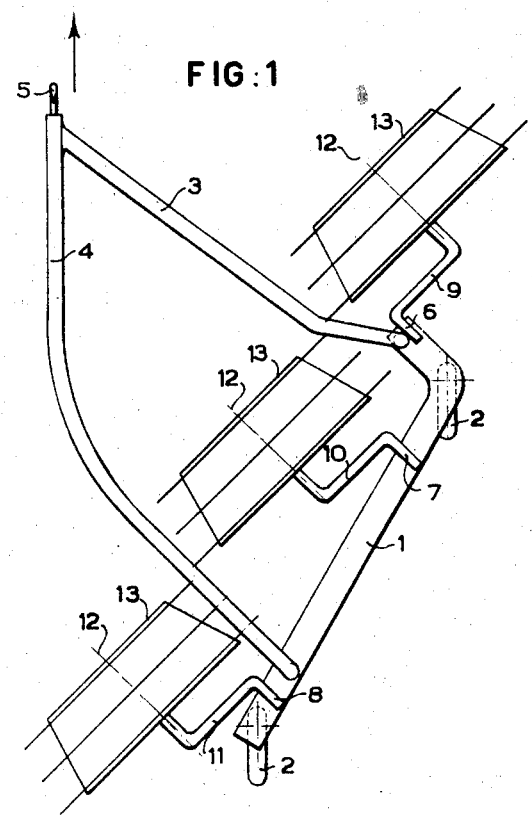
FIG:1
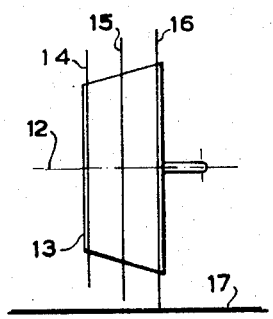
FIG:2

United States Patent Office 2,852,905
Patented Sept. 23, 1958

2,852,905

ROTARY RAKING WHEEL

Cornelis van der Lely and Ary van der Lely, Maasland, Netherlands, assignors to C. van der Lely N. V., Maasland, Netherlands, a Dutch limited company of the Netherlands Application January 13, 1954, Serial No. 403,718

Claims priority, application Netherlands January 16, 1953

6 Claims. (Cl. 56—400)

This invention relates to devices for laterally displacing grass, hay or like material lying on the ground, and more specifically to devices of the kind comprising a mobile frame carrying at least one rotatory raking member which is peripherally provided with raking teeth or like catching members and which is rotated by contact with the ground and/or material lying thereupon.

In raking devices of this kind rotatory raking members are normally provided in the form of rake wheels which each include a crown or series of raking fingers or teeth situated in a single plane which is coplanar with the plane of the associated wheel. With such rake wheels, it is very difficult to work terrain to a completely clean condition while at the same time, avoiding damage to the turf by the raking action of the teeth.

It is an object of the present invention to eliminate these drawbacks and, in so doing, the invention contemplates providing a raking device in which each rotatory raking member comprises at least two crowns or series of raking elements, said series being spaced relative to the axial direction of the raking member. The elements of that series which is located hindmost with reference to the travelling direction of the device are preferably closer to the ground during rotation of said raking member than the corresponding elements of the foremost series.

In operation, the greater part of rakable material lying on the ground is pushed aside by the foremost series of raking elements, whereas the next series of raking elements delivers smaller quantities of said material. In particular the rearmost series of raking elements, which generally contacts the ground, is positioned to engage the parts of the material lying between the stubbles of crop and elevations in the ground. For small quantities of rakable material lying on the ground, the rotation of the raking member is chiefly determined by the rearmost series of raking elements contacting the ground. If, however, large quantities of material are concerned, the rotation of the raking member is principally determined by the foremost series of raking elements, due to the relatively great pressure of material against said foremost raking elements.

The invention also contemplates disposing the crowns of raking elements on a rotatable member provided in the form of a raking cage or drum.

In further accordance with the invention, there is provided a raking cage or drum in which the radius of the circle upon which the extremities of the raking elements of a crown are located is smaller for the foremost crown than for the rearmost crown. Rotation of one of the crowns of raking elements causes rotation of the other crown or crowns, whereby the raking elements of all the crowns will have the same angular velocity. However, the circumferential speed of the raking elements of the hindmost crown is greater than that of the elements of the foremost crown, which is advantageous regarding raking action of the whole raking member.

Figure 4:
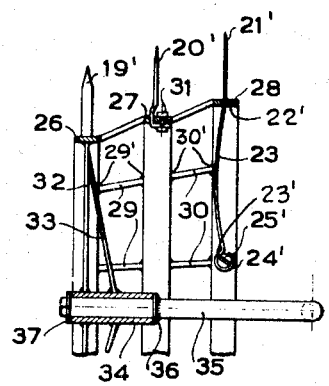

With these and other objects, features and details in view, the invention is next more fully described with reference to the accompanying drawings in which some embodiments of the invention are shown by way of example and in which:

Fig. 1 diagrammatically shows a side delivery rake with three raking cages or drums provided in accordance with the invention in plan view, Fig. 2 is a side elevation of one of the above raking drums in active position with regard to the ground, Fig. 3 is a partial sectional view on a larger scale taken on the line III—III in Fig. 1 showing the attachment of the raking elements to the drum, and Fig. 4 shows a similar sectional view of another embodiment in which the raking member is formed as an open cage.

According to Fig. 1, the frame of a side delivery rake comprises a beam 1 supported by two running wheels 2. Bow shaped bars 3 and 4 extend from said beam 1 towards a lug 5 which may be connected to a tractor. The beam 1 carries the crank shafts 6, 7 and 8 of cranks 9, 10 and 11, respectively, the crank pins 12 of which bear rotatable drums or cages 13. The cranks 9, 10 and 11 may be connected in the manner disclosed in British Letters Patent 680,537 to the frame by means of springs which permit the drums to rest with slight pressure upon the ground.

The bows 3 and 4 are formed in such a manner that they extend over the drums, as well as over the material which passes along said drums and which may accumulate to a substantial height.

Each of the drums 13 is provided with three crowns of fingers or teeth or other raking elements, viz. a foremost crown 14, a middle crown 15 and a rearmost crown 16, only the raking elements of said latter crown 16 being normally in contact with the ground 17.

As appears from Fig. 3, the raking or catching elements of the crown 14, which will practically never be in contact with the ground, consist of rigid teeth 19 welded to a rotary raking member or metal cone 18. The raking elements of the crowns 15 and 16, however, consist of thin flexible teeth 20 and 21, respectively, which latter are resiliently or movably fixed to extend through openings 22 in the wall 18. The teeth 21, which along with the teeth 19 and 20 are radially and somewhat obliquely arranged, are each bent at large angles near the opening 22 and extend as straight rods 23 having an extremity with the shape of an eyelet 24 located against the wall 18 of the drum and secured to said wall 18 by means of a bolt 25.

The wall 18 of the drum is connected by means of spokes (not shown) to a hub which is rotatable about the axle 12.

In the embodiment shown in Fig. 4, the raking elements are combined as an open cage. This cage is composed of three rings 26, 27 and 28 of unequal diameter, adjacent rings being interconnected by strips 29 and 30 welded at 29' and 30' to the rings. The smallest ring 26 carries a crown of rigid teeth 19', the middle ring 27 carries flexible teeth 20' fixed with bolts 31 and the largest ring 28 carries thin teeth 21' extending through openings 22' in the ring 28, the extremities of extensions 23 being bent at 23' in the shape of eyelets 24' and being secured to the ring 28 by means of bolts 25'. The extensions 23 are bent in such a manner that they do not interfere with each other.

The ring 26, upon which the largest forces are exerted, is connected to a bushing 34 by two crowns of spokes 32 and 33. The bushing 34 is mounted on the crank pin 35 of one of the cranks 9, 10 and 11 in Fig. 1. A collar 36 on the crank pin 35 resists axial pressure, while a washer 37 keeps the bushing 34 locked in position. The whole cage is mounted for free rotation upon a crank pin 35.

There will now be obvious to those skilled in the art many modifications of the structure set forth which do not depart essentially from the spirit of the invention as defined in the following claims.

What we claim is:

1. A rotary raking member for laterally displacing material lying on the ground comprising an axle, a hub supported on said axle, at least two axially spaced rows of radially extending elongated raking members operatively connected to said hub, the raking members of one of said rows terminating at a greater distance from said axle than the raking members of said other row, the members of the row terminating at the greater distance from the axle being resilient for contact with the ground and material thereon.

2. A rotary raking member as claimed in claim 1 comprising a drum mounted on said hub and supporting said raking members.

3. A rotary raking member as claimed in claim 1 wherein all of said raking members terminate on a conical surface.

4. A rotary raking member as claimed in claim 1 wherein said hub is an open-work shell.

5. A rotary raking member as claimed in claim 1 wherein the raking members of one row are fixedly connected to said hub and the raking members of the other row are movably attached to said hub.

6. A rotary raking member as claimed in claim 1 where the raking members of one row are resiliently coupled to said hub.

References Cited in the file of this patent

UNITED STATES PATENTS

| | | |
|---|---|---|
| 18,462 | Longshore | Oct. 20, 1857 |
| 596,114 | Jarmain | Dec. 28, 1897 |
| 2,158,299 | Oppenheim | May 16, 1939 |
| 2,519,005 | Thompson et al. | Aug. 15, 1950 |
| 2,669,820 | Falkner | Feb. 23, 1954 |
| 2,670,588 | Plant | Mar. 2, 1954 |
| 2,712,723 | Ryan | July 12, 1955 |

FOREIGN PATENTS

| | | |
|---|---|---|
| 16,646 | Great Britain | 1903 |